July 31, 1962  B. KASMANN  3,047,222
REMOVABLE SLIDE FOR SLIDE RULE
Filed July 5, 1960
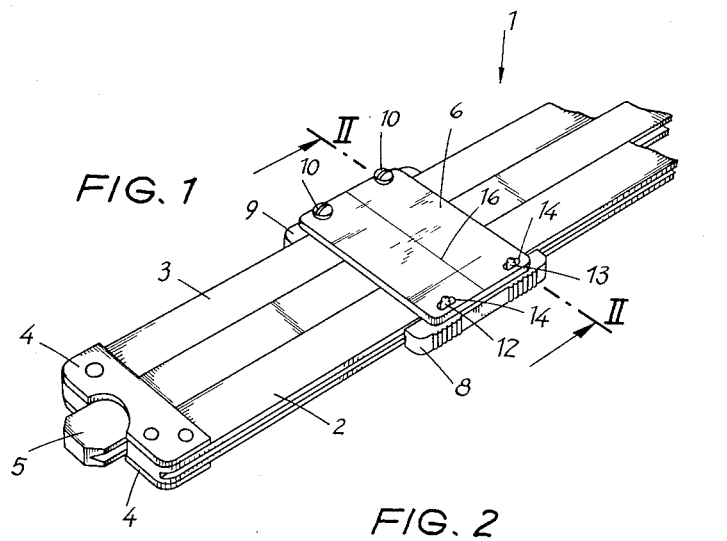
FIG. 1
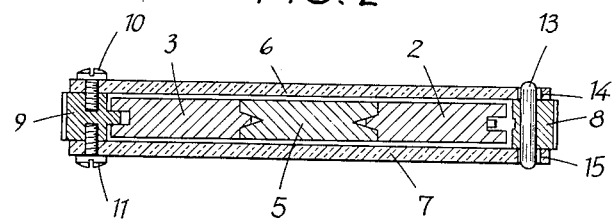
FIG. 2
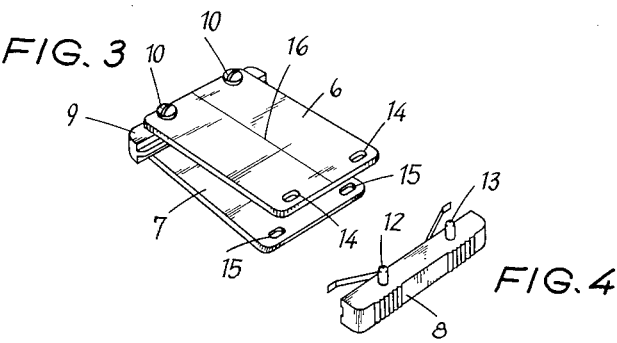
FIG. 3
FIG. 4

3,047,222
REMOVABLE SLIDE FOR SLIDE RULE
Bernhard Kasmann, Neuweiherhaus 65,
Nurnberg 34, Germany
Filed July 5, 1960, Ser. No. 40,810
3 Claims. (Cl. 235—70)

The present invention relates to improvements in slide rules and more particularly in the slide for a double-faced slide rule.

In a conventional double-faced slide rule, the slide is provided with upper and lower transparent face plates which are held at the proper distance from each other by lateral guide strips which serve as means for facilitating the sliding adjustment of the slide and also for accurately aligning the markings in the two face plates with each other. These face plates are therefore connected to the guide strips in a manner so as to prevent them from shifting relative to each other during the ordinary use of the slide rule and to permit their relative adjustment only after the connecting means have been loosened. In double-faced slide rules in which the slide cannot as in a one-faced slide rule be slipped off one end of the rule because the two parts of the rule are usually connected to each other at their ends by end plates, it is, however, often desirable or even necessary to remove at least one face plate of the slide from at least one guide strip so as to permit the slide to be removed from the rule, for example, for cleaning it of dust and dirt particles which might have collected during the use of the slide rule underneath the face plates and on the guide strips and which obstruct the free movability of the slide and render it difficult to read the indications on the rule and on the slide bar accurately.

In the conventional slide rules, the face plates are usually secured to at least one guide strip by screws which have to be removed in order to remove the slide from the rule. This requires the use of a small screw driver which is often not available when needed. For this reason, in some prior slide rule constructions, in place of screws, a pin is provided at the edge of one face plate of the slide at the side facing toward the rule, and this pin is inserted into a suitable opening in the guide strip. By lifting the face plate, this pin may be withdrawn from its opening in the guide strip and the slide may then be withdrawn from the rule over the opposite lateral edge thereof. In order to prevent the slide from being removed too easily, the mentioned pin has also been made in the form of a push-button which is associated with a corresponding opening in the guide strip.

In the use of slide rules which are provided with such slides it has, however, been found that the highly sensitive surfaces of the rule with the scales thereon become very easily scratched since, when the slide is being withdrawn, the pin on the lower side of the face plate of the slide is pressed by the inherent tension of this plate against the surface of the scale. Furthermore, the face plates of such a slide are also subjected to a very great strain when the slide is being withdrawn from the rule, since one face plate has to be bent considerably because of the length of the pin and the other because of the thickness of the guide strip. A further disadvantage resides in the fact that it is difficult to clean such a slide since, after it has been removed from the rule, both face plates engage again on the guide strip unless they are unscrewed therefrom. It is then only possible to clean the slide by pushing a rag through it from the two open sides thereof. This is insufficient especially in those cases when the free gap between the face plates is too narrow for passing a rag so far therethrough that the tip thereof can be grasped at the other side so that the rag can then be pulled back and forth to wipe the face plates sufficiently to clean them thoroughly and especially to clean their edges and corners on the guide strips.

It is therefore an object of the present invention to provide a slide for a double-faced slide rule which overcomes all of the above-mentioned disadvantages, and in order to attain this object, the invention provides a slide in which at least one of the two guide strips may be removed from the upper as well as from the lower face plate of the slide by disengaging a clamping or plug-in connection or the like. Such a construction has the advantage that, while the slide is being withdrawn from the rule, the face plates do not have to be subjected to any bending stresses, and further that, after the slide is removed, it can be very easily cleaned since, due to the removal of one guide strip, there will be three open sides through which a cleaning rag may be inserted.

Obviously, the cleaning operation will be still easier if both guide strips are removed from both face plates, which may also be done according to the invention, although in most cases it will be sufficient in actual practice if only one of the guide strips can be removed from the two face plates.

A very suitable type of connection between the guide strips and the face plates will be attained according to the invention by providing at least one of the guide strips both on its upper and lower sides with one or more pins which are adapted to engage into apertures or recesses in the lateral edge of the face plates. Such a construction permits a very easy removal of the face plates from one guide strip since these plates then only need to be slightly lifted for a moment to permit the guide strip to be pulled out laterally, whereupon both face plates may then be withdrawn from the rule in a released condition in which they are still spread apart and cannot scratch the scale faces of the rule in any manner.

In mounting the pins in the guide strips it is of advantage for reasons of a more simple construction and for attaining a more accurate and secure seat of the pins if they pass entirely through the guide strips and project at the upper and lower sides thereof. Entirely apart from this it is possible to provide the apertures or recesses in the face plates in the form of notches or slots on the edges of the plates or as holes near the edges. In any event, it is of advantage if such slots or holes are elongated in the direction of movement of the slide so as to permit the two face plates to be adjusted relative to each other to bring the markings thereon in exact alignment with each other or to the desired distance from each other in accordance with the scale markings on the rule before these face plates are finally secured to one of the guide strips.

The aforementioned objects, features, and advantages of the present invention will become further apparent from the following detailed description thereof, particularly when the same is read with reference to the accompanying drawings, in which—

FIGURE 1 shows a perspective view of a part of a slide rule which is provided with a slide according to the invention;

FIGURE 2 shows a cross section taken along line II—II of FIGURE 1;

FIGURE 3 shows a perspective view of a slide from which one of the guide strips has been removed; while FIGURE 4 shows a perspective view of the guide strip which is removed from the slide according to FIGURE 3.

Referring to the drawings, the slide rule is composed of the two lateral parts 2 and 3 of the rule which are provided with scales at the opposite faces thereof and are rigidly secured to each other by end plates 4 at both ends of the rule. Between these two parts 2 and 3 of the rule, the slide bar is slidably guided.

The slide of the double-faced slide rule consists of an upper face plate 6 and a lower face plate 7, and two guide strips 8 and 9 which are slidably guided along the outer sides of the rule parts 2 and 3.

Since the rigidly secured end plates 4 prevent the slide from being slipped off one or the other end of the rule, the guide strips 8 and 9 are removably connected to the face plates 6 and 7. While guide strip 9 is secured to the face plates in the conventional manner by screws 10 and 11, guide strip 8 is provided according to the invention with pins 12 and 13 which project slightly from the upper and lower sides of the guide strip and engage into recesses or holes 14 and 15 in face plates 6 and 7.

In the particular embodiment of the invention as illustrated in the drawings, these holes 14 and 15 at both sides of the face plates are elongated in order to permit the two face plates and the markings 16 thereon to be adjusted relative to each other before the screws 10 are tightened on guide strip 9. This embodiment of the invention permits the guide strip 8 to be removed from the face plates 6 and 7 by bending these two plates slightly apart for a short moment and by simultaneously slipping the pins 12 and 13 out of the elongated holes 14 and 15 in the face plates.

After the slide has then been withdrawn from the rule in the direction toward part 3 of the latter, the slide may be easily cleaned from its three open sides, as shown in FIGURE 3, without requiring any screws to be loosened.

Although my invention has been illustrated and described with reference to the preferred embodiment thereof, I wish to have it understood that it is in no way limited to the details of such embodiment but is capable of numerous modifications within the scope of the appended claims.

Having thus fully disclosed my invention, what I claim is:

1. An improved slide for a slide rule having upper and lower faces and opposite longitudinal sides comprising: upper and lower transparent and resilient face plates arranged to extend transversely across the upper and lower faces respectively of said rule with the corresponding edges of said face plates coinciding, and those corresponding edges extending along one longitudinal side of said rule defining apertures adjacent said edges; guide strips oppositely arranged along said longitudinal sides and positioned to space said face plates apart, and, respectively, to slidably engage said longitudinal sides, one of said guide strips being rigidly connected to corresponding unapertured edges of said face plates; smooth surfaced connecting means extending both upwardly and downwardly from the other of said guide strips and adapted to slidably engage in the apertures defined in said corresponding apertured edges of the upper and lower face plates when said plates are sprung apart, and to be retained therein by the resilient return of the plates to their original positions.

2. A slide for a slide rule as described in claim 1 wherein said smooth-surfaced connecting means comprise pins mounted in the other of said guide strips and extending therethrough to engage the apertures of said face plates with respective upper and lower parts of each pin.

3. A slide for a slide rule as described in claim 1 wherein said apertures defined in said corresponding edges are elongated in the longitudinal directions of movement of said slide, thereby making said face plates relatively adjustable with each other in the directions of their motion.

References Cited in the file of this patent
UNITED STATES PATENTS

| | | |
|---|---|---|
| 1,150,771 | Keuffel | Aug. 17, 1915 |
| 2,968,438 | Bachmann et al. | Jan. 17, 1956 |